United States Patent [19]

Otsuka et al.

[11] 4,343,426
[45] Aug. 10, 1982

[54] METHOD OF FABRICATING AN ANNULAR TANK

[75] Inventors: Katsuyuki Otsuka; Akio Todokoro; Yoshiharu Takahashi; Kazuhito Hiroe; Yoshinobu Ishikawa, all of Tokai, Japan

[73] Assignee: Doryokuro Kaku Nenryo Kaihatsu Jigyodan, Tokyo, Japan

[21] Appl. No.: 121,052

[22] Filed: Feb. 13, 1980

[30] Foreign Application Priority Data

Feb. 20, 1979 [JP] Japan ............................... 54-18718
Feb. 20, 1979 [JP] Japan ............................ 54-20418[U]

[51] Int. Cl.³ ........................................... B23K 31/00
[52] U.S. Cl. ..................................... 228/170; 228/184
[58] Field of Search ................. 250/506; 228/184, 170

[56] References Cited

U.S. PATENT DOCUMENTS

| 3,120,400 | 2/1964 | Carpenter | 228/184 |
| 3,216,749 | 11/1965 | Summerfield | 228/184 |
| 3,972,464 | 8/1976 | Codo et al. | 228/184 |
| 4,152,585 | 5/1979 | Myers | 250/506 |
| 4,171,002 | 10/1979 | Smith | 250/506 |
| 4,244,482 | 1/1981 | Baumgart et al. | 228/184 |

Primary Examiner—John McQuade
Attorney, Agent, or Firm—George B. Oujevolk

[57] ABSTRACT

An annular tank for storing nuclear reaction material in an annular space formed among seamless upper and lower annular dies disposed elevationally in a predetermined space and inner and outer sheaths extended on the inner and outer peripheral surfaces of the upper and lower dies. The tank avoids thermal strain and deformation by forming the upper and lower dies in a seamless manner to thus enhance the heat dissipating effect together with high working accuracy and strength. The method of fabricating the annular tank is simple by omitting the use of jigs for welding the segments with less loss and high production yield.

5 Claims, 11 Drawing Figures

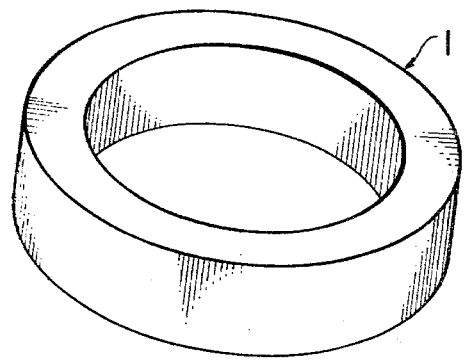
FIG. IA
FIG. IB
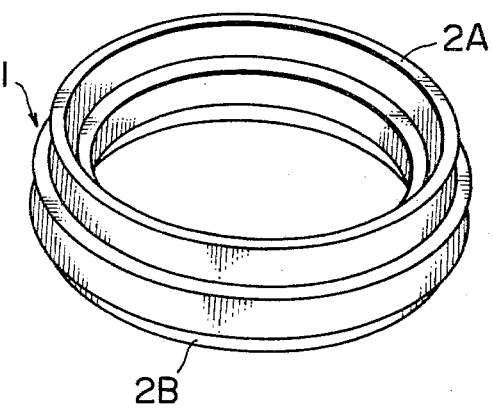
FIG. IC
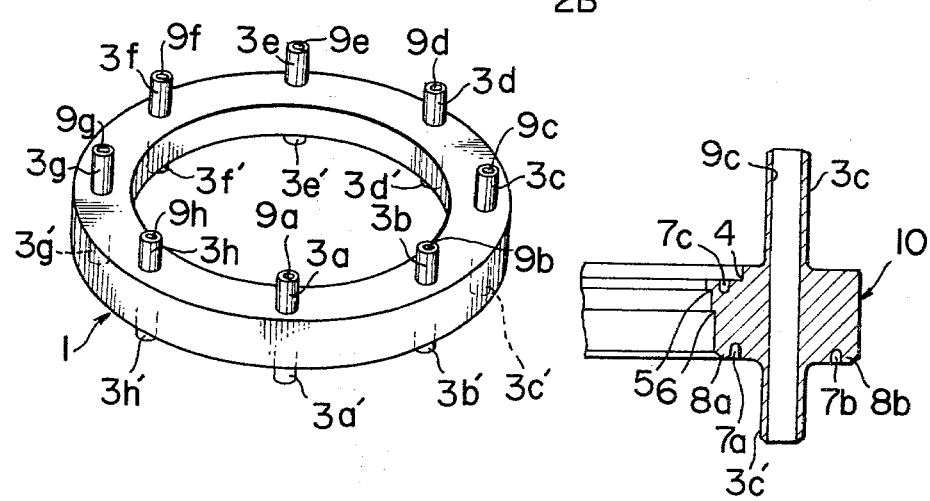
FIG. ID

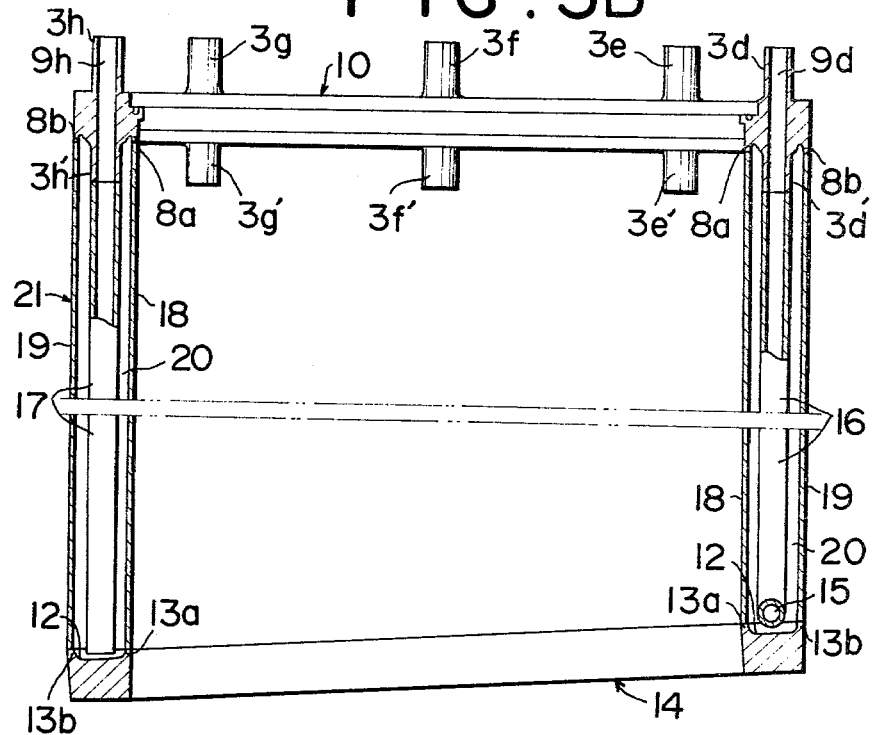
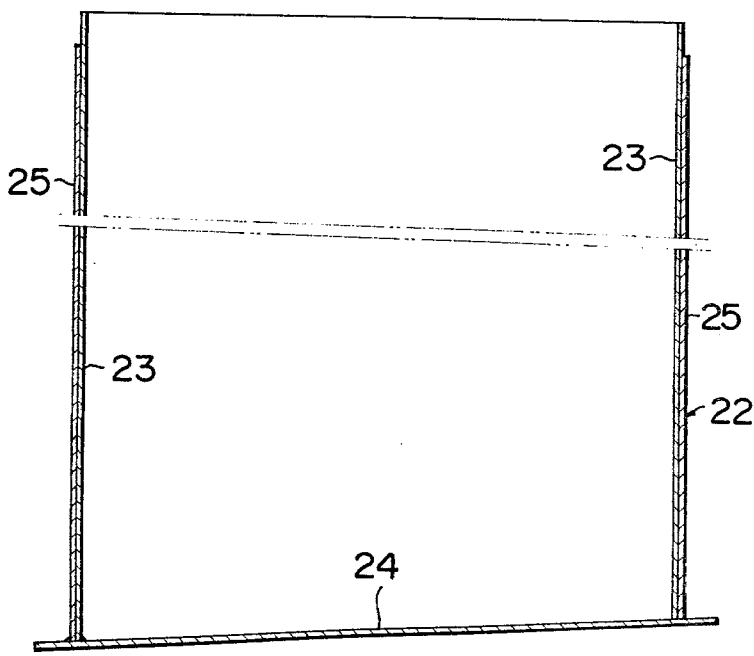

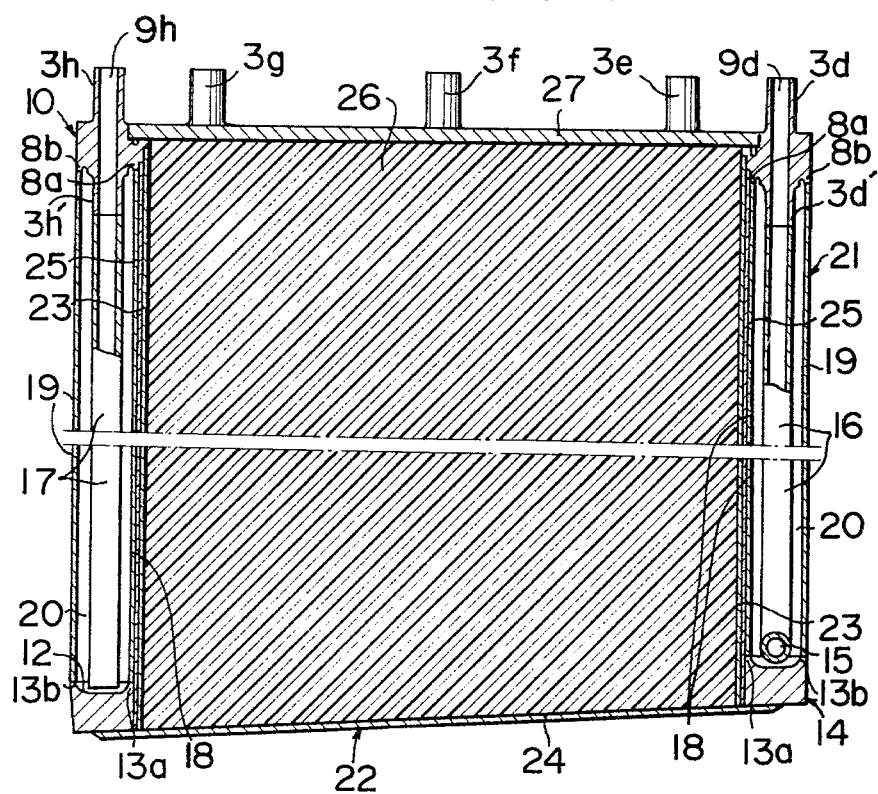

METHOD OF FABRICATING AN ANNULAR TANK

BACKGROUND OF THE INVENTION

This invention relates to nuclear reaction material storage and, more particularly, to an annular tank for storing nuclear reaction material and a method of fabricating the annular tank for storing various types of nuclear reaction material dissolved in a solvent.

There is a solvent extraction method as one of the methods of wet reprocessing spent nuclear fuel in a nuclear fuel cycle (an outpile fuel cycle). The method essentially handles water soluble nuclear reaction materials such as uranium U, plutonium Pu, thorium Th dissolved in a solvent such as nitrate or the like and employs an annular tank as one container for storing the fuel liquid.

The conventional annular tank thus used in the method of reprocessing spent nuclear fuel is constructed to form a annular space to contain reaction material by annular upper and lower dies (with an inlet hole) disposed in space, and inner and outer sheaths extended at the inner and outer peripheries of both the dies. This tank must be precisely produced in the same manner as various devices and equipment in the nuclear reaction field so that even an accidental radiation leakage cannot occur resulting in a large sacrifice in production, technical working, efficiency and cost.

It has heretofore been proposed, for the purpose of alleviating the aforementioned problems to some degree, to produce an annular tank using the steps of dividing a blank of an upper die into segments by means of pressing and cutting operations, forming the upper die by welding the segments, forming a channel-shaped lower die by pressing a plate blank to thus reduce material of the upper die, to alleviate the difficuty in the production technique, to enhance the working efficiency, and to simplify the production of the lower die.

The upper die can thus be enhanced in accuracy upon fabrication of the segments, however another problem occurs when welding the segments such as thermal deformation at welding time, deflection caused by the thermal work together with an apprehension of cracks at the welded portions. In addition, since the lower die is made of thin plate plate, it accommodates low thermal capacity to cause feasible strain at the inner and outer sheaths at welding time which finally results also in difficulty in accuracy with regard to passing a nondestructive inspection by external appearance, size and X-ray irradiation.

OBJECTS OF THE INVENTION

Accordingly, an object of this invention is to provide an annular tank for storing nuclear reaction material which can eliminate the aforementioned problems to enhance the accuracy and strength thereof.

It is another object of this invention to provide an annular tank for storing nuclear reaction material which can avoid thermal deformation by a seamless upper die.

It is yet another object of this invention to provide an annular tank for storing nuclear reaction material which also avoids thermal strain of a lower die. The annular tank contemplated herein has thickness and is without seam and can enhance its heat dissipating effect together with high accuracy and strength.

It is a further object of this invention to provide a method of fabricating the annular tank for storing various type of nuclear reaction material dissolved in a solvent which can be carried out without technical difficulty.

It is still another object of this invention to provide a method of fabricating the annular tank for storing nuclear reaction material which can omit the use of jigs for welding segments with less loss and high yield.

It is still another object of the invention to provide a method of fabricating the annular tank which can largely reduce the production costs.

SUMMARY OF THE INVENTION

The present invention contemplates an annular tank for storing nuclear reaction material in an annular space using seamless upper and lower annular dies disposed elevationally in a predetermined space, with inner and outer sheaths which extend on the inner and outer peripheral surfaces of the upper and lower dies. The tank avoids thermal strain and deformation by forming the upper and lower dies in a seamless manner to enhance the heat dissipating effect. The use of jigs for welding segments of the workpiece is avoided.

BRIEF DESCRIPTION OF THE DRAWINGS

The above and other related objects and features of the invention will be apparent from a reading of the following description of the disclosure found in the accompanying drawings and the novelty thereof pointed out in the appended claims.

FIGS. 1A through 1D are views of one preferred embodiment of the upper components of the annular tank constructed according to the present invention;

FIGS. 3A through 3C are views of the components of the annular tank for explaining the method of fabricating the tank according to the present invention; and FIG. 4 is a side sectional view of the preferred embodiment of the annular tank of this invention.

DETAILED DESCRIPTION OF THE PREFERRED EMBODIMENTS

Figure 2A:
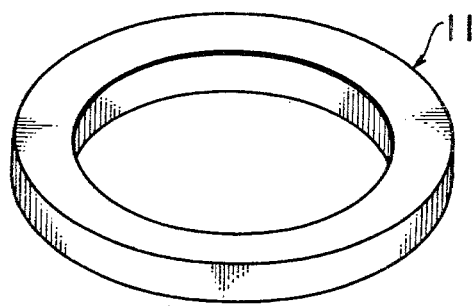
FIGS. 2A through 2C are views of the preferred embodiment of the lower components of the annular tank of this invention.

Referring to the drawings, particularly to FIGS. 1A through 1D showing the components of the annular tank of the preferred embodiment of the present invention, wherein like reference numerals designate the same parts, an annular blank 1 is a forged piece of rustless metal such as stainless steel, which is normally fabricated by the steps of cutting a round metal bar in predetermined length, boring the cut bar, and forging the bored bar or cutting a pipe in predetermined length and forging the cut pipe, further cutting the inner and outer peripheries of the bar to predetermined diameters, and polishing as required, as particularly shown in FIG. 1A.

The annular blank 1 thus worked is then cut as shown in FIG. 1B. Thus, the upper, inner and outer peripheral surfaces as well as the lower, inner and outer peripheral surfaces of the blank 1 are cut to thereby form upper and lower slim annular walls 2A, 2B.

As shown in FIG. 1C, a pair of upper and lower bar-like portions 3a, 3a'; 3b, 3b'; ... 3g, 3g', and 3h, 3h' are formed coaxially at respective vertical axes on the upper and lower surfaces of the blank 1. As further shown in FIG. 1D, stepped portions 4, 5 and 6 are cut on the inner peripheral surface of the blank 1, welding protruded edges 8a and 8b are cut via recesses 7a and 7b on the inner and outer peripheries of the lower surface of the blank 1, and a recess 7c is cut on the inner periphery of the upper surface of the blank 1. In addition, through holes 9a, 9b, ... 9g and 9h are perforated longitudinally through the bar-like portions 3a, 3a' through 3h, 3h' to thus form predetermined upper die 10.

Figure 2B:
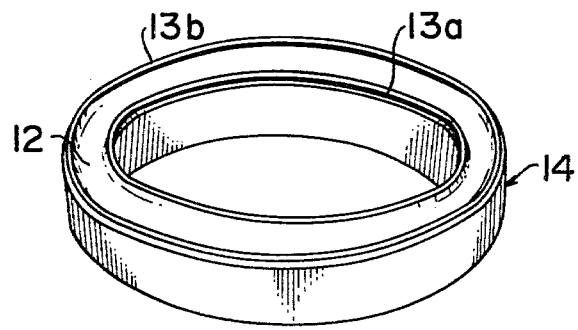
Figure 2C:
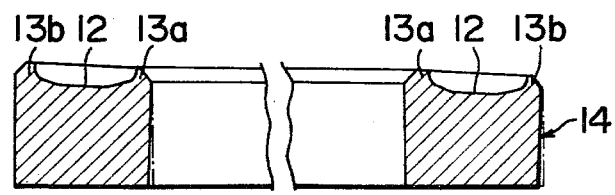

FIGS. 2A through 2C show the fabricating steps of the lower die together with the lower die shape in detail.

An annular blank 11 is, as shown in FIG. 2A, a forged piece similar to annular blank 1. As shown in FIGS. 2B and 2C, the blank 11 is cut to form a recess groove 12 on the upper surface thereof, welding protruded edges 13a and 13b on the inner and outer peripheries of the upper surface thereof to thereby form a lower die 14.

Since this lower die 14 is obliquely disposed with respect to the horizontal plane in the assembling step, which will be described hereinafter, it is formed in vertical surface partially on the inner and outer peripheral surfaces as designated by two-dotted broken lines in FIG. 2C. The lower die 14 is further set in height (elevational thickness) more than three times the depth of the recess groove 12 such as, for example, five times.

The upper and lower dies 10 and 14 thus formed are assembled with other members to form predetermined annular tank as will be described in detail.

Figure 3A:
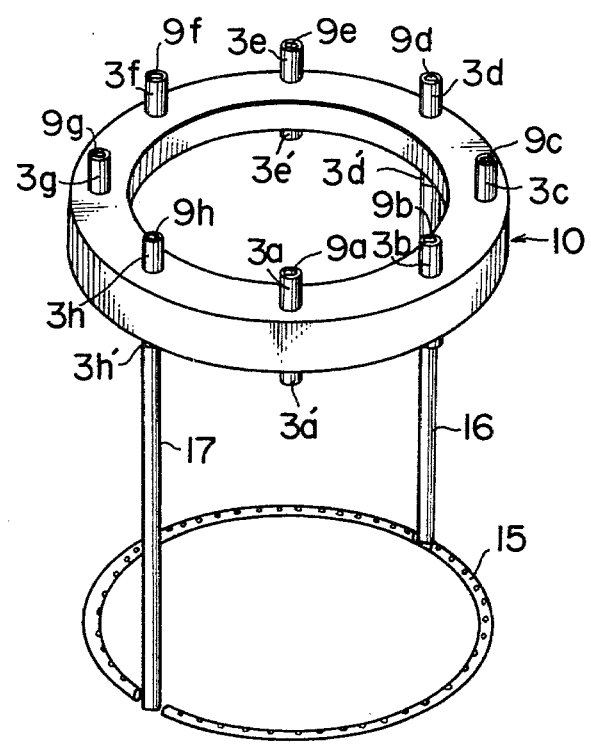

As shown in FIG. 3A, a gas feed tube 16 is welded at the upper end thereof to the lower end of the bar-like portion 3d' perforated with the hole 9d of the upper die 10 so that an annular stainless steel gas jet tube 15 is connected to the tube 16, a stainless steel feed tube 17 is connected to the lower end of the bar-like portion 3h' perforated with the hole 9h, and a temperature detector or other device (not shown) is mounted to the lower end of the other bar-like portions. Then, an annular tank 21 is assembled, as shown in FIG. 3B, by the steps of holding the horizontal upper die 10 and oblique lower die 14 in a predetermined position in space, welding the corresponding upper and lower peripheral edges of the inner sheath 18 and the protruded edges 8a and 13a via cylindrical stainless steel inner sheath 18 between the protruded edges 8a and 13a on the inner periphery of the dies 10 and 14, and welding relatively the upper and lower peripheral edges of the outer sheath 19 and the protruded edges 8b and 13b via the outer sheath 19 of stainless steel cylinder between the protruded edges 8b and 13b on the outer peripheries of both the dies 10 and 14 to form predetermined annular space 20.

A spacer may also be interposed in the annular space 20 at this time.

A container or vessel 22 with bottom shown in FIG. 3C is mounted within the above annular tank 21. This container 22 is composed of stainless steel cylinder 23 and bottom 24, and cadmium cylinder 25 provided on the outer periphery of the cylinder 23, and as shown in FIG. 4, internally mounted therein from the lower surface of the annular tank 21 so that the upper peripheral edge of the cylinder 23 is welded to the inner periphery of the upper die 10 and the outer periphery of the bottom 24 is welded to the bottom of the lower die 14 to thus mount the container 22 within the annular tank 21.

Filler 26 such as paraffin or the like is filled within the container 22, and a cover 27 is coated of stainless steel on the upper surface of the container 22.

The annular tank 21 of this invention thus fabricated according to the method of this invention contains water soluble nuclear reaction material such as plutonium nitrate within the annular space 20 via the feed tube 17, which material is uniformly stirred by the air fed and injected through the tube 16 from the tube 15 and taken out of the annular space 20 via the tube 17 as required.

If the inner diameter of the tank 20 is less than predetermined value when the nuclear reaction material is filled in the space 20 of the annular tank 21, nuclear reaction takes place by the radiation toward the inside and the inner diameter of the tank 21 is accordingly set at a safety factor so that this does not occur. Since the cadmium cylinder 25 provided in the container 22 and filler 26 such as paraffin are interposed as shields within the annular tank 21, it can secure the safety and prevent the above dangerous accident.

It should be understood from the foregoing description that since the annular tank 21 of this invention as fabricated by the method of this invention uses seamless upper die 10 and thick lower die 14 which are not pressed, in thin material without seam, it can eliminate the thermal strain and deformation of the upper and lower dies due to the welding work of the segments and to the welding work of the inner and outer sheaths but can enhance the heat dissipation effect, and can further sufficiently accurately carry out its function even with an error in size of, for example $53_{-2}^{+0}$ (mm) and the like between the inner and the outer sheaths together with satisfactory strength.

It should also be appreciated that since the upper and lower dies 10 and 14 of the annular tank 21 described herein can be formed in an annular shape merely by cutting the annular blank without a seam, it can avoid the technical working difficulties, omit the use of jigs at the time of working the segments, and, since the annular upper and lower dies are formed from an annular blank, it can reduce the material loss and increase the yield and productivity because of the use of accurate upper and lower dies 10 and 14 resulting in a large reduction in cost.

What is claimed is:

1. A method of fabricating an annular tank for the storing of nuclear reaction material in an annular space using upper and lower dies elevationally disposed in space and inner and outer sheaths extended over the inner and outer peripheries of the upper and lower dies, said method comprising the steps of:

(a) preparing a first and a second annular blanks;
   (b) cutting in the first blank a plurality of pairs of upper and lower longitudinal coaxial bar-like members, said members extending upwards and downwards on the upper and lower surfaces of the first blank and forming protruding welding edges on the inner and outer peripheries of the lower surface of the blank;
   (c) perforating the upper and lowr pairs of said bar-like members longitudinally and coaxially therethrough to form the upper die;
   (d) forming a recess groove on the upper surface of the second blank and forming welding protruded edges on the inner and outer perpheries of the upper surface of the second blank to form the lower die; and,
   (e) contacting and welding the upper and lower dies at said protruding edges of the inner and outer perpheries of said first and second dies held elevationally in a predetermined position in space with the upper and lower edges of said inner and outer sheaths.

2. A method according to claim 1, wherein at the step of cutting the first blank, the inner and outer peripheries of the upper and lower surfaces of the blank are cut out so as to form residual annular thin walls on the upper and lower surfaces, and the first blank is so cut along parts of the circumference of the inner and outer annular walls so as to form the bar-like members on the upper and lower surfaces of the blank.

3. A method of fabricating an annular tank storing nuclear reaction material according to claim 1, wherein the two annular blanks are made of forged rustless metal.

4. A method according to claim 1, wherein the lower die is obliquely disposed with respect to the horizontal plane, and the outer periphery thereo is disposd on the same vertical plane as the outer peripheral surface of the outer sheath or inside the vertical plane.

5. A method according to claim 1, wherein the height of the lower die is at least three times the depth of the recess groove of the die.

* * * * *